INVENTORS
Harrison W. Fuller
Robert R. Evans
BY Fred Jacob
ATTORNEY

INVENTORS
Harrison W. Fuller
Robert R. Evans
BY Fred Jacob
ATTORNEY

*INVENTORS*
Harrison W. Fuller
Robert R. Evans
BY Fred Jacob
*ATTORNEY*

INVENTORS
Harrison W. Fuller
Robert R. Evans
BY Fred Jacob
ATTORNEY

INVENTORS
Harrison W. Fuller
Robert R. Evans
BY Fred Jacob
ATTORNEY

March 21, 1961 H. W. FULLER ET AL 2,976,517

DATA READOUT SYSTEM

Filed Jan. 28, 1957

6 Sheets-Sheet 6

INVENTORS
Harrison W. Fuller
Robert R. Evans

BY Fred Jacob
ATTORNEY

United States Patent Office 2,976,517
Patented Mar. 21, 1961

2,976,517

DATA READOUT SYSTEM

Harrison W. Fuller, Needham Heights, and Robert R. Evans, Bedford, Mass., assignors, by mesne assignments, to Laboratory for Electronics, Inc., Boston, Mass., a corporation of Delaware Filed Jan. 28, 1957, Ser. No. 636,820

15 Claims. (Cl. 340—172.5)

Figure 1:
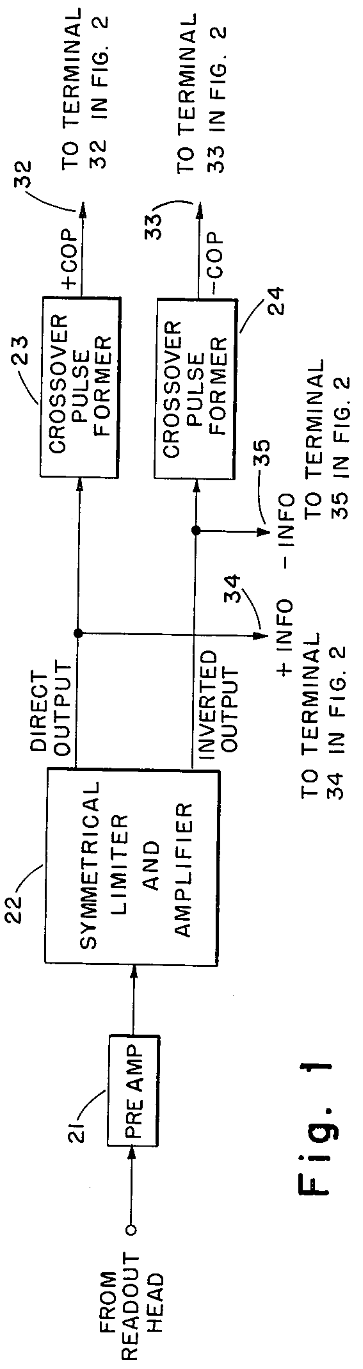

The present invention relates in general to a new and improved self clocked system for reading binary digital data from a high density magnetic data storage medium.

Binary digital data is commonly stored in a magnetic data storage medium in the form of periodically occurring magnetized areas, the direction of magnetization of each area being indicative of either a ONE or a ZERO digit. Data readout occurs during the relative motion of the storage medium with respect to a magnetic readout head, successive magnetized areas which pass under the readout head producing a voltage waveform at the output thereof having a distinctive characteristic which corresponds to the direction of magnetization of the areas being read out. In one method of data readout, the waveform derived from the output of the readout head is periodically sampled by means of clock pulses which occur in synchronism with the binary digits represented by said waveform. In an externally clocked readout system, the clock pulses are stored on a separate clock track of the data storage medium from which they are derived for further use in reading the stored data digits. In a high density data storage system, the clock track creates the problem of proper alignment between the readout head of each data track and that of the clock track. In such a system, where the magnetized areas representative of the binary digits are extremely small, the close tolerances required for proper mechanical alignment raise serious questions of economy. This problem is particularly acute where magnetic data storage drums are used and the physical spacing between the data track and the clock track is appreciable. The torsional twist which may occur in such a drum is sufficient to cause the loss of data at these high storage densities due to the relative displacement of the two tracks.

In a copending application of Harrison W. Fuller and Robert C. Kelner entitled Data Processing, Serial No. 505,894, filed May 4, 1955, the foregoing problem is solved by providing a self-clocked data readout system wherein the needed clock pulses are derived from the stored data. A crossover pulse is produced every time there is a polarity crossover in the output waveform due to a change in the direction of magnetization of successive areas being read out. A clock pulse is derived from each crossover pulse and a gate is formed therewith. This gate is delayed and used to bracket the next occurring crossover pulse, the polarity of which yields information as to the nature of the binary digit read.

In a magnetic data storage medium where data is recorded at very high storage densities of the order of 1000 digits per inch, a considerable amount of overlap occurs between adjacent magnetized areas. Under certain conditions, this prevents the occurrence of polarity crossovers, while at other times it gives rise to spurious crossovers. For example, a true polarity crossover occurs intermediate any two unlike binary digits. Thus, a sequence of stored alternating binary digits, i.e. a sequence of alternating One's and Zero's spaced at periodic intervals, will give rise to a sequence of true crossovers as represented by the waveform at the output of the readout head. Accordingly, a sequence of periodically occurring true crossover pulses will be derived therefrom. On the other hand, in a succession of like binary digits the overlap of adjacent magnetized areas may prevent the occurrence of true polarity crossovers. The waveform derived from short sequences of like binary digits, although containing small amplitude variations, may be devoid of any polarity crossovers whatever. In longer sequences of like binary digits, the general amplitude level of the waveform is sufficiently low for the aforesaid small amplitude variations to produce spurious polarity crossovers. The latter will give rise to spurious crossover pulses, i.e. pulses which do not have the same phasing relative to the stored binary digits as the aforesaid true crossover pulses.

The purpose of this invention is to overcome the problems arising from the overlap of adjacent magnetized areas at very high storage densities. To this end, a clock pulse is derived from each true crossover pulse a predetermined time interval after the latter's occurrence, said clock pulse bearing a fixed phase relationship to its corresponding binary digit represented by the waveform. Thereafter, each clock pulse is used to sample the instantaneously read out digital data represented by the waveform. The signals derived from successive sampling operations are compared and an output signal is produced. In the event that a true crossover pulse does not occur due to a succession of two or more like binary digits, the last generated clock pulse is regenerated by recirculating it at proper time intervals. Alternatively, regenerative reproduction of clock pulses may be obtained by means of a phased oscillator or the like. Upon the appearance of the next true crossover pulse, regeneration ceases and the operation is carried on as before.

The stored digital data is arranged in blocks, the beinning of each block being preceded by a digital block start code from which a characteristic waveform start code pattern is derived. Detection means are provided which are responsive to the crossover pulses produced by the aforesaid start code pattern to initiate the data readout of a data block. Any deviation from the start code pattern is sufficient to reject the digit sequence under examination. Only after the entire start code pattern has been detected is the data readout operation initiated.

Accordingly, it is a primary object of this invention to provide a new and improved self-clocked magnetic data readout system.

It is another object of this invention to provide a self-clocked magnetic data readout system for use with a high density magnetic data storage medium by utilizing clock pulses to sample the instantaneously occurring data waveform, said clock pulses being unequivocally derived from the previously occurring data waveform despite the effect of considerable overlap of adjacent magnetized areas.

It is a further object of this invention to provide a self-clocked magnetic data readout system for use with a high density magnetic data storage medium by utilizing clock pulses derived from true crossover pulses, said clock pulses being regeneratively reproduced at proper time intervals in the absence of newly derived true crossover pulses.

It is an additional object of this invention to provide a self-clocked magnetic data readout system wherein the data is arranged in blocks, and means are provided uniquely responsive to the recognition of a characteristic digital start code pattern preceding each block of data to initiate the readout thereof.

Figure 3:
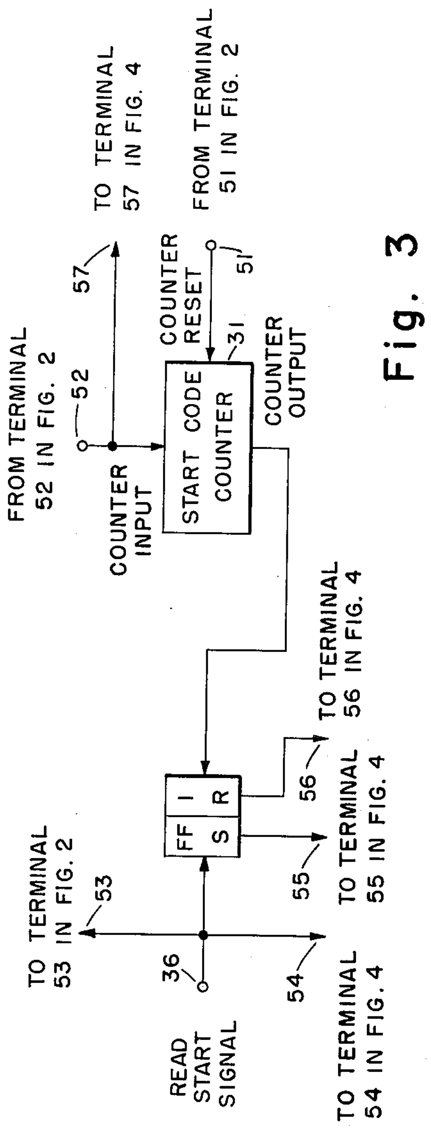
Figure 2:
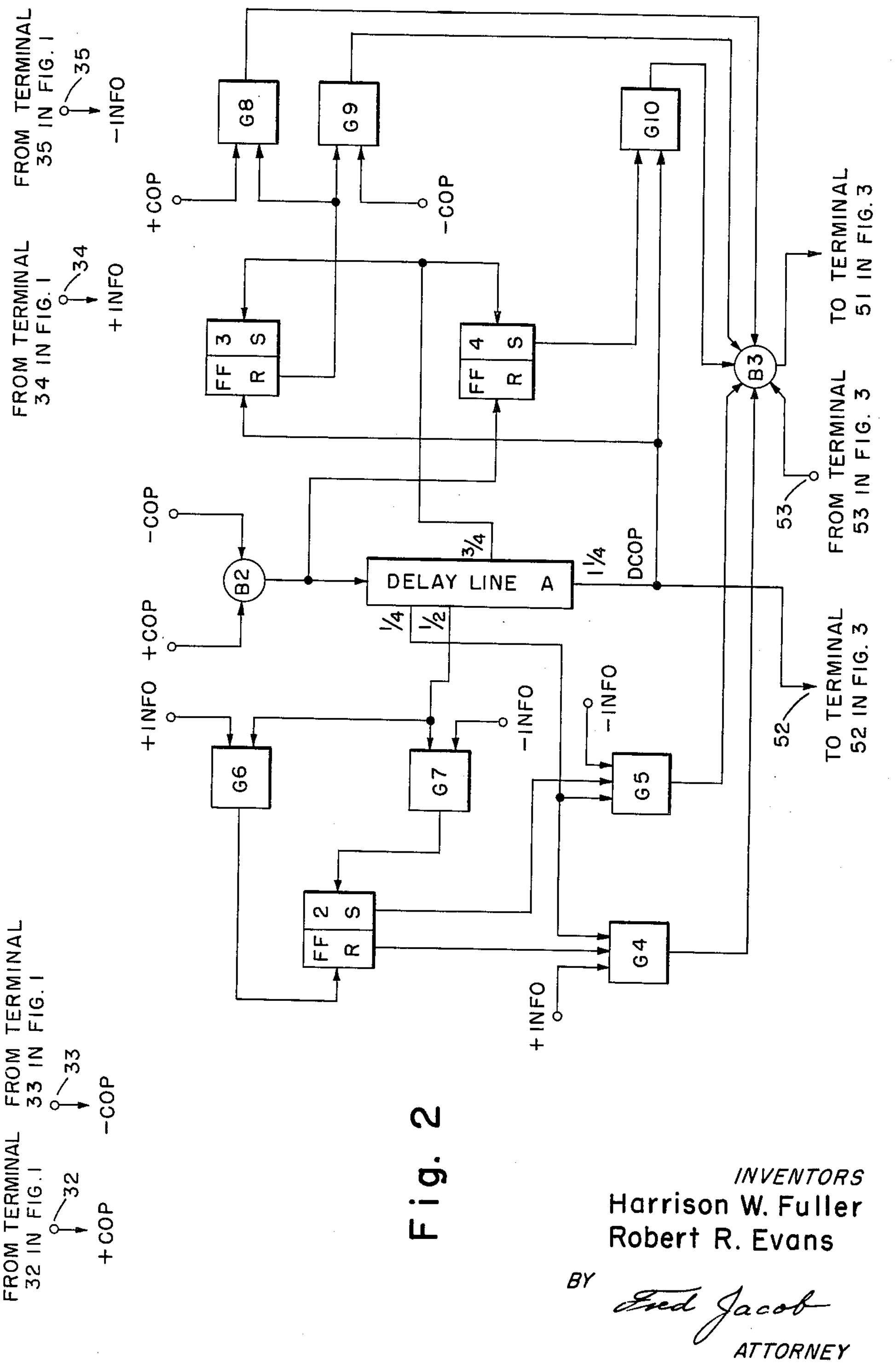
Figure 4:
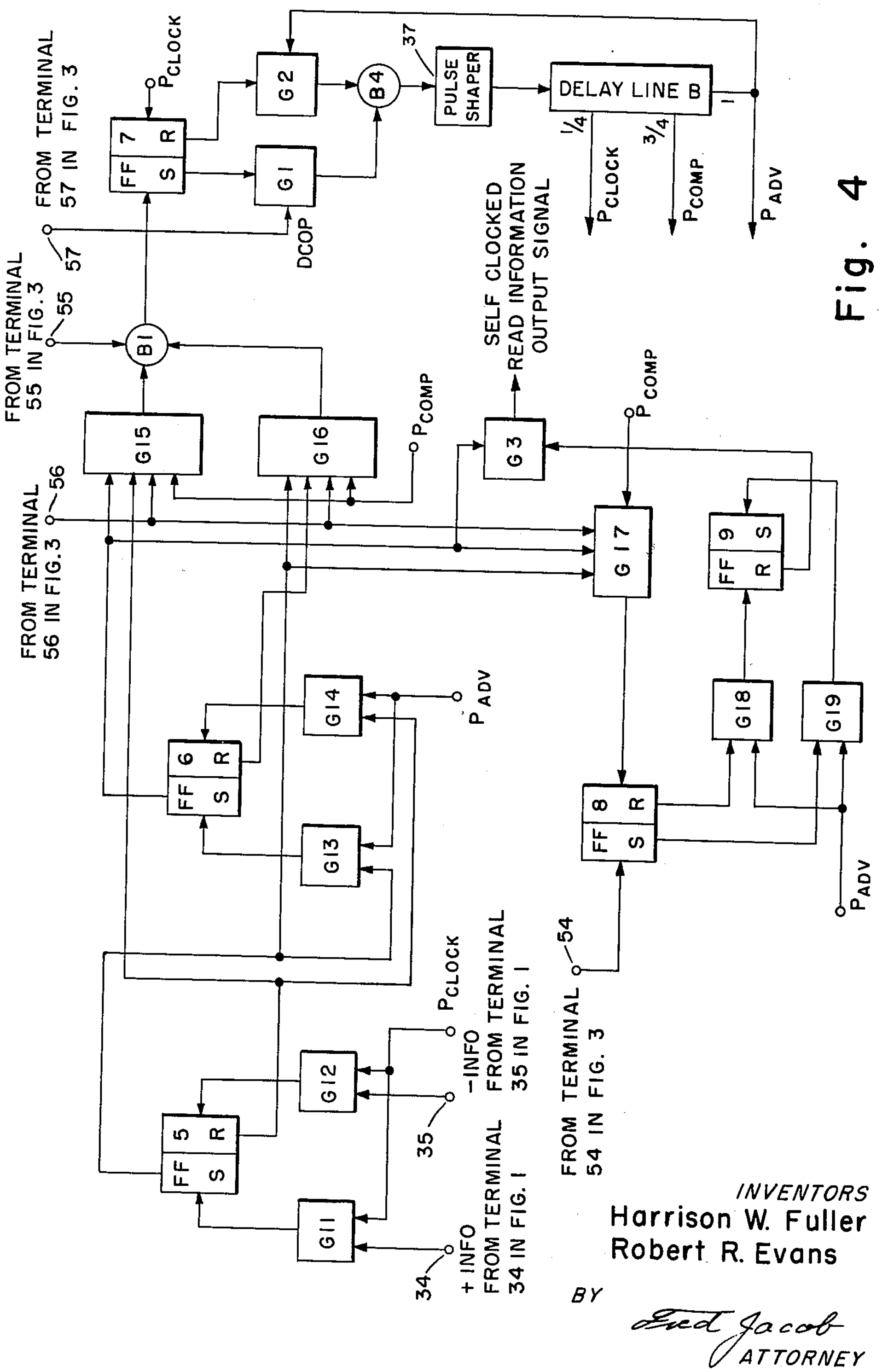
Figure 5:
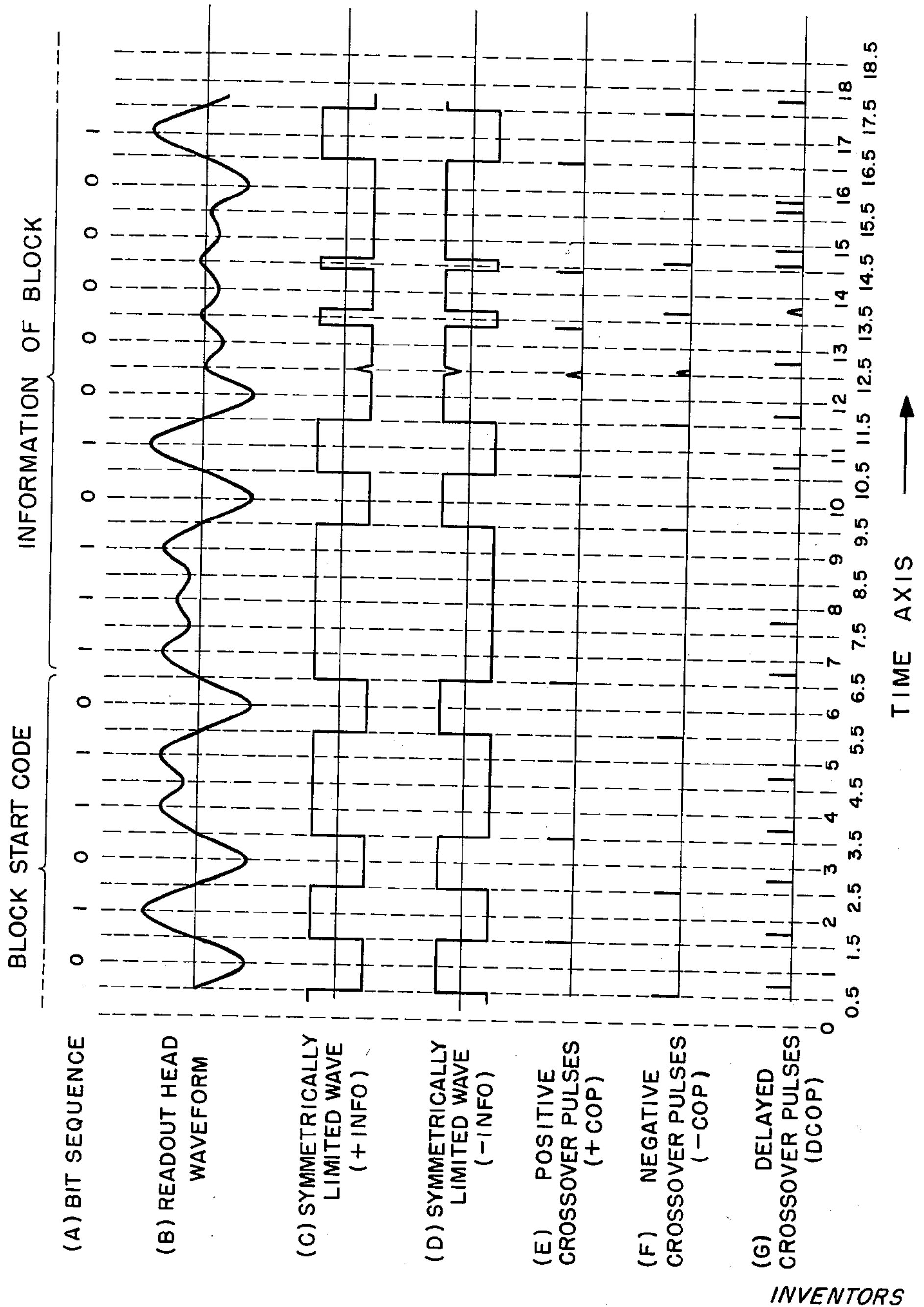
Figure 5:
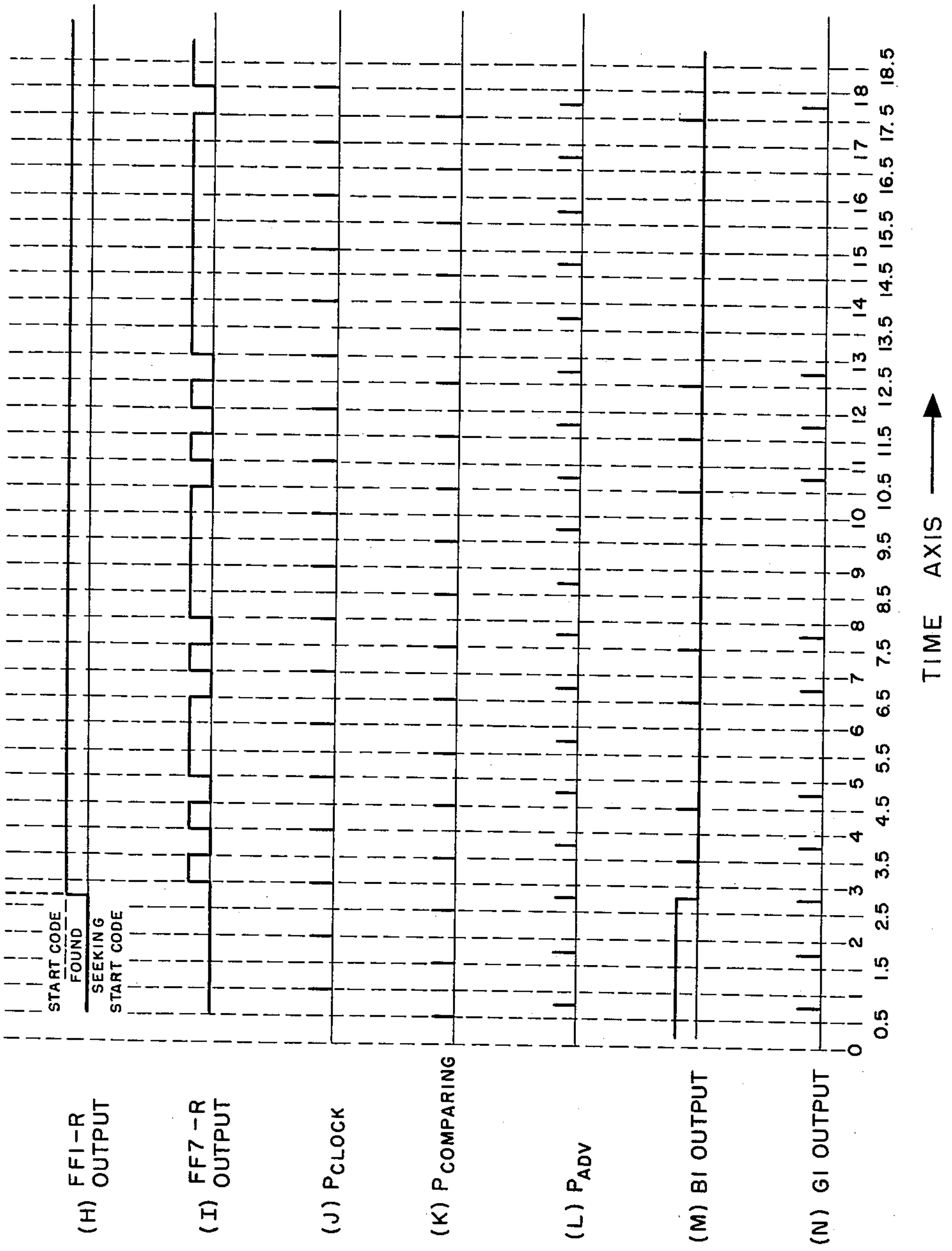
Figure 5:
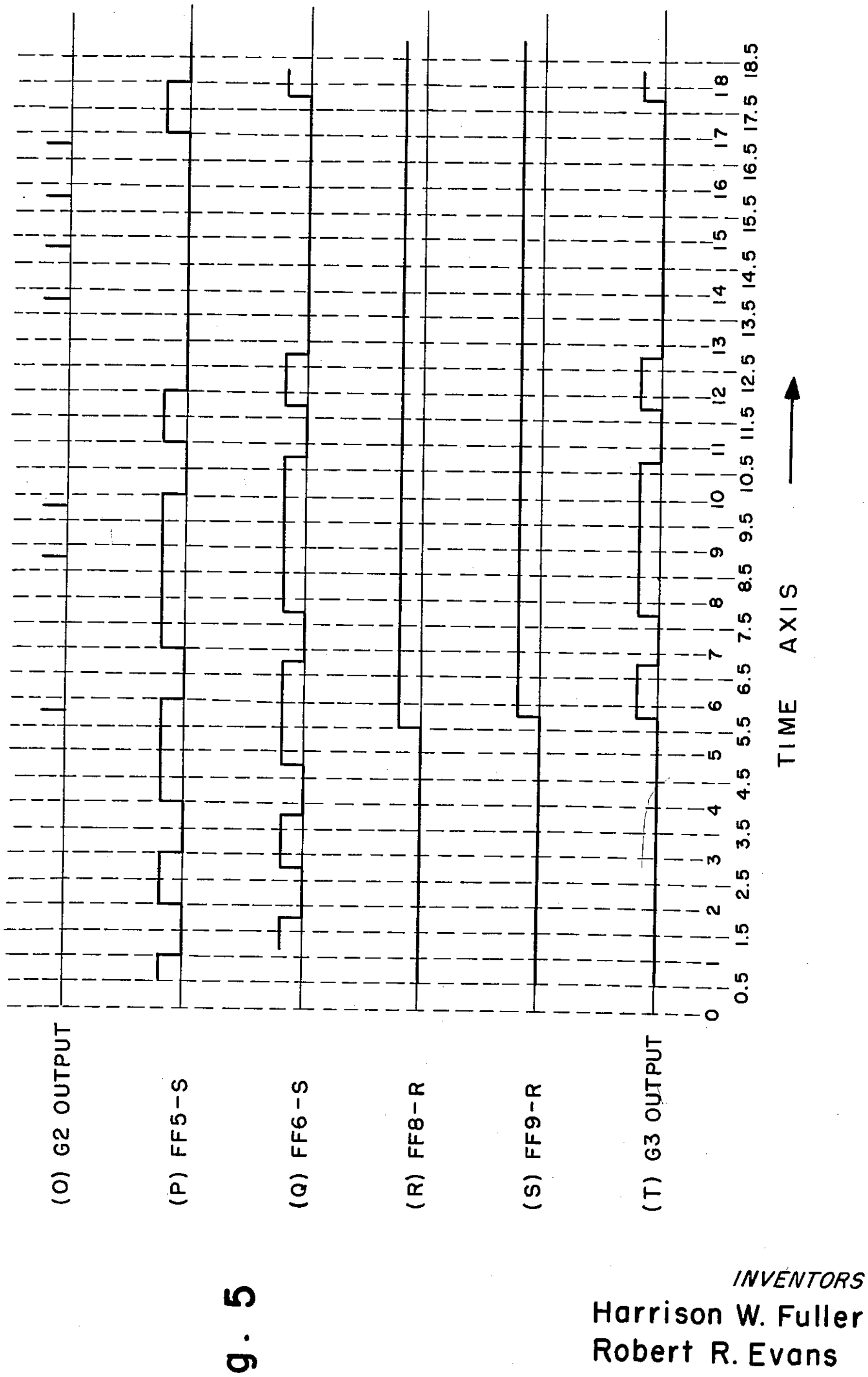

These and other objects of the invention will become more apparent from the following specification in connection with the accompanying drawings, in which:

Fig. 1 is a schematic illustration of the apparatus used to derive a waveform and crossover pulses from the data stored in the magnetic medium;

Figs. 2, 3 and 4 constitute a schematic illustration of the self-clocked data readout system; and Figs. 5A–5T illustrate a number of waveforms drawn to the same time base which are necessary to form an understanding of the invention.

With reference now to Fig. 1, preamplifier 21 receives the output signal derived from the readout head. The output of the preamplifier is connected to block 22 which contains a symmetrical limiter and amplifier. The direct output signal derived from block 22 constitutes the "plus" information (+INFO) and is further passed on to crossover pulse former 23 to produce positive crossover pulses denoted as +COP. The inverted output signal of block 22 constitutes the "minus" information (—INFO) and is passed on to crossover pulse former 24 to produce negative crossover pulses denoted as —COP.

The apparatus of the self-clock readout system of Figs. 2, 3 and 4 comprises a plurality of circuit elements connected so as to perform logical computer operations. Corresponding terminals in Figs. 1, 2, 3 and 4 have been labeled accordingly in the drawings. Every circle in the drawing represents a buffer circuit denoted by the letter B and a number, which yields an output signal upon receiving a signal at any one of its inputs. Each square denoted by the letter G and a number, represents an "and" gate which produces an output signal upon receiving a signal on every one of its inputs. Every divided rectangle denoted by the letters FF and a number, represents a flip-flop circuit which exists either in the "set" or the "reset" condition as denoted by the letters S and R. For example, an output signal from gate G6 will put flip-flop FF–2 into the reset state whereupon an output signal will appear at the R output which is further fed to gate G4. Alternatively, an output signal from gate G7 will set flip-flop FF–2 to produce an S output signal which is fed to the input of gate G5. Accordingly, the operation of the flip-flop circuit is bistable and the output signal from the reset section of flip-flop FF–2 will continue until an input signal is received from gate G7. Thereafter, an output signal will be produced from the set section of flip-flop FF–2 while the output signal from the reset section ceases.

The operation of the apparatus illustrated in Figs. 1 and 2, 3 and 4 will now be explained with the aid of the waveforms shown in Figs. 5A–5T. The numerical time base of Figs. 5A–5T is provided for convenient reference, each unit of time being of equal duration as the pulse period which corresponds to the interval between the stored digits. Fig. 5A illustrates an example of a binary digit sequence encoded in the magnetic medium. The data is arranged in blocks, each data block encoded in the magnetic medium being preceded by a characteristic block start code comprising a sequence of alternating Zero and One digits. The termination of the block start code is indicated by a One and a Zero succeeding the last One of the sequence. The apparatus shown herein is so arranged that the number of alternating One's and Zero's which occur must be in excess of a predetermined minimum before readout of the data block is initiated. A sample of the information contained in the data block is shown in Fig. 5A following the block start code. Fig. 5B illustrates the waveform obtained at the output of the readout head which forms the input signal of preamplifier 21 of Fig. 1. A true polarity crossover occurs midway between any two alternating binary digits. A sequence of alternating binary digits, such as occurs during time intervals 1 to 4 as indicated on the time axis, comprises waveform polarity crossovers at times 1.5, 2.5, and 3.5 respectively. Short successions of like binary digits produce small waveform amplitude variations without producing polarity crossovers. Longer sequences of like binary digits, such as the succession of binary Zero's from time 12 to time 16, produce a sufficiently low amplitude level so that the amplitude fluctuations will produce spurious crossovers. It is to be noted that the latter do not necessarily occur midway between the stored binary digits.

Figs. 5C and 5D illustrate the direct and inverted output signals available at terminals 34 and 35 respectively, of Fig. 1 after the reading head waveform has been amplified and amplitude limited. The signals so obtained comprise the +INFO and —INFO signals which are further utilized in the system of Figs. 2, 3 and 4. Crossover pulse formers 23 and 24 produce the positive and negative crossover pulses (+COP and —COP) shown in Figs. 5E and 5F respectively. It will be seen that a positive crossover pulse occurs whenever the waveform of Fig. 5C changes from a negative to a positive polarity, in like manner as the waveform of Fig. 5B from which it is directly derived. A negative crossover pulse is derived whenever the waveform of Fig. 5B changes from positive to negative, the inverted —INFO signal of Fig. 5D simultaneously changing from negative to positive. Positive and negative crossover pulses are available at terminals 32 and 33 respectively, and are further used in the self-clocked readout system of Figs. 2, 3 and 4. For the sake of simplicity, the connections to terminals 32, 33, 34 and 35 have been omitted in Figs. 2, 3 and 4, the signals derived from these terminals being individually labeled wherever they are used.

In operation, flip-flop FF–1 of Fig. 3 is set by a Read Start signal in order to initiate the code search. Additionally, buffer B2 of Fig. 2 receives positive and negative crossover pulses which are fed to a delay line A in Fig. 2. The crossover pulses are delayed by 1¼ bit periods in the delay line and are then fed to a counter 31 in Fig. 3. The latter is adapted to count the number of crossover pulses fed to it. Upon reaching a predetermined number, said number being sixteen in the block start code of the preferred embodiment, a counter output signal is produced which resets flip-flop FF–1 in Fig. 3. The function of the two successive One's occurring at times 4 and 5 will be explained below. The crossover pulse occurring at time 5.5 is utilized in the readout operation of the first binary digit of the data block. It should be noted that other unique combinations of binary digits may be used as block start codes. With the present block start code, a timing device could be used in lieu of the counter, e.g. a charging condenser, wherein the time interval elapsed since the advent of the first crossover pulse is measured against a predetermined minimum time interval. In either of these embodiments, a reset signal must be provided which will interrupt the counting sequence or the time measuring operation whenever a signal is derived which indicates a deviation from the block start code pattern before the latter is terminated. In the instant case, a determination that such a deviation has occurred will produce a signal at the output of buffer B3 in Fig. 2, which interrupts the counting sequence of counter 31 and resets the latter to initiate a new counting sequence. Delay line A has intermediate taps from which crossover pulses delayed by one-quarter, one-half and three-quarter pulse periods may be derived. Crossover pulses delayed by 1¼ pulse periods, such as represented in Fig. 5G, will hereafter be referred to as delayed crossover pulses and are labeled DCOP in Fig. 2, while intermediately delayed pulses are more specifically denoted. As shown in Fig. 2, delayed crossover pulses are applied to flip-flop FF–3 where they reset the latter and produce an output signal which conditionally opens gates G8 and G9. Crossover pulses delayed by a ¾ pulse period, when applied to flip-flop FF–3, set the latter and terminate the output signal from the reset section. Gates G8 and G9 are additionally adapted to receive positive and negative crossover pulses respectively. If the first crossover pulse appears on terminal 33 at time 0.5, a reset signal will conditionally open gates G8 and G9 at time 1.75, i.e. 1¼ pulse periods after the occurrence of the first crossover pulse. At time 1.75, when the first crossover pulse is at the output of delay line A, the second crossover pulse which appeared on terminal 32 at time 1.5, will be at the ¼ point of the delay line. Half a pulse period later at time 2.25, the second crossover pulse will be at the ¾ point of the delay line. The signal then tapped off from the delay line sets flip-flop FF–3 which serves to discontinue the reset signal applied to gates G8 and G9 and to close the latter. If a spurious crossover pulse appears on terminals 32 or 33 in the period extending from time 1.75–2.25, i.e. 1¼ to 1¾ pulse periods after the occurrence of the first crossover pulse, one of gates G8 and G9 will produce an output signal which is fed to buffer B3. The output signal then derived from the latter will reset the counter. For example, the spurious negative crossover pulse occurring at time 14.6, shown in Figs. 5E and 5F to occur 1.3 pulse periods after the spurious positive crossover pulse occurring at time 13.3, will produce an output signal from gate G9 which will have the effect of resetting the counter. Each crossover pulse applied to buffer B2 resets flip-flop FF–4, while ¾ pulse periods later the same flip-flop circuit is set and produces an output signal which conditionally opens gate G10. If a new crossover pulse does not occur in the time interval extending from ¾ to 1¼ pulse periods after the appearance of a crossover pulse on terminal 32 or 33, e.g. from time 1.25 to 1.75, flip-flop FF–4 will not be reset. The delayed crossover pulse, appearing at the output of the delay line at time 1.75, will open gate G10 to pass a signal. Buffer B3 will then produce an output signal which will reset counter 31 in Fig. 3. This condition occurs at any time when there is a succession of like binary digits and no polarity crossovers occur. The conditions following the positive crossover pulses which occur a time 3.5 and 6.5, as shown in Fig. 5E, are illustrative thereof. As illustrated in Fig. 2, gates G6 and G7, together with flip-flop FF–2, and gates G4 and G5, assure that the counter is reset in the event that the information polarity is incorrect ¼ pulse period after the occurrence of a crossover pulse, i.e. in the event that a true crossover pulse did not occur. ½ pulse period after the occurrence of a crossover pulse, one of gates G6 or G7 is opened and produces an output signal, depending on the polarity of the instantaneously occurring information derived from terminals 34 and 35. Depending on which gate produces an output signal, flip-flop FF–2 is either set or reset to produce an output signal which conditionally opens one of gates G4 or G5. ¾ pulse periods later, the next occurring crossover pulse reaches the ¼ point on delay line A, whence it is tapped off and fed to gates G4 and G5. Since one of these gates is conditionally open due to the signal received from flip-flop FF–2, the appearance of an information signal of the proper polarity on one of terminals 34 and 35 will open that gate and produce a counter reset signal. While the start code pattern, wherein One's alternate with the Zero's, appears on terminals 34 and 35, no output signal is derived from gate G4 or G5. On the other hand, the situation at time 12.4 and 12.6, when spurious positive and negative crossover pulses are produced, will produce a counter reset signal. In this case, as shown in Fig. 5F, ½ pulse period after the negative crossover pulse which appears on terminal 33 at time 11.5, a negative information signal appears on terminal 35 and gate G7 opens to set flip-flop FF–2. The set signal derived from flip-flop FF–2 will open gate G5 conditionally. At time 12.75, ¼ pulse period after time 12.5 when crossover pulses of both polarities occur, another signal derived from delay line A is applied to gate G5. Concurrently, a negative information signal, received from terminal 35, is applied to gate G5. Accordingly, the latter gate will open to produce a counter reset signal at its output.

A single pulse read start signal, derived from a source 36 in Fig. 3, initiates the readout operation. Flip-flop FF–1 in Fig. 3 is set by this signal, thereby producing an output signal. As shown in Fig. 4, the latter signal is buffered to flip-flop FF–7 to set the latter. The set signal derived from flip-flop FF–7 conditionally opens gate G1. In this condition, any delayed crossover pulse which may occur will pass gate G1. A buffer B4 buffers this pulse to pulse shaper 37, the output of which feeds into delay line B. Clock pulses, denoted $P_{clock}$, are tapped off from delay line B after being delayed ¼ pulse period, while comparing pulses, denoted as $P_{comp}$, are derived after a delay of ¾ pulse periods. Advancing pulses, denoted as $P_{adv}$, are derived after a delay of one full pulse period and are recirculated to gate G2. These pulses are respectively illustrated in Figs. 5J, 5K and 5L. As in the case of the signals derived from terminals 32, 33, 34 and 35 respectively, the drawing has been simplified by individually labeling these signals wherever they are applied. After the start code has been detected, a counter output signal occurs at time 2.75 which resets flip-flop FF–1. This is shown in Fig. 5H which illustrates the reset output signal. The reset signal so derived conditionally opens gates G15 and G16. Whenever a true crossover pulse occurs, the subsequently occurring comparing pulse will open one of gates G15 and G16 to produce an output signal from buffer B1 which will set flip-flop FF–7. As a result, the subsequently occurring delayed crossover pulse will pass through gates G1 and into delay line B. The subsequently occurring clock pulse will reset flip-flop FF–7 and produce an output signal therefrom which will conditionally open gate G2. Before the next advancing pulse from the output of delay line B arrives ¾ pulse periods after the occurrence of the aforesaid clock pulse, the comparing pulse which occurs ½ pulse period later opens one of gates G15 and G16 to produce an output signal from buffer B1 which sets flip-flop FF–7. In the event that no signal appears at the output of buffer B1 due to the absence of a true crossover, flip-flop FF–7 remains in the reset position. The subsequently occurring advancing pulse is recirculated and passes through gate G2 whereupon, after passing through the pulse shaper, it again enters delay line B. Accordingly, in the absence of crossover pulses, clock pulses as well as comparing pulses and advancing pulses continue to be produced by recirculating the pulses appearing at the output of delay line B. The operation of the reset section of flip-flop FF–7 is illustrated in Fig. 5I, the waveform being indicative of an output signal from the reset section of said flip-flop circuit. The signals derived at the output of buffer B1 are illustrated in Fig. 5M and will be more fully explained hereafter. The output signals of gates G1 and G2 are shown in Figs. 5N and 5O, respectively. It will be noted that the output signals (not illustrated) of buffer B4 comprise a sequence of periodic pulses which consist of the combined output signals of gates G1 and G2. The polarity of the waveforms appearing on terminals 34 and 35 in Fig. 1 is sampled in gates G11 and G12 at clock pulse intervals, the output signals of these gates being applied to flip-flop FF–5. An output signal derived from flip-flop FF–5 is applied to one of gates G13 and G14 and is advanced to flip-flop FF–6 upon the arrival of the advancing pulse. Gate G15 is adapted to receive the reset signal of flip-flop FF–5 and the set signal of flip-flop FF–6, while gate G16 is adapted to receive the set signal of flip-flop FF–5 and the reset signal of flip-flop FF–6. The set signals derived from these two flip-flop circuits are illustrated in Figs. 5P and 5Q respectively. The signals applied to gates G15 and G16 are indicative of the waveform polarity as sampled by successive clock pulses. Accordingly, they determine whether or not a true crossover pulse occurred in the interval between clock pulses. Additionally, both of gates G15 and G16 have the reset signal of flip-flop FF–1 applied to them. Upon the arrival of a comparing pulse applied to gates G15 and G16, a signal is derived from one of these gates if a true crossover has occurred, causing buffer B1 to produce an output signal. Specifically, if the waveform sampled by the first clock pulse is positive, gate G11 opens to produce a set signal at the output of flip-flop FF–5 which is applied to gate G16. The arrival of an advancing pulse thereafter, opens gate G13 to set flip-flop FF–6 and applies a set signal derived therefrom to gate G15. If a true crossover has occurred, the waveform polarity will be negative at the time that the next clock pulse arrives to sample it. Accordingly, upon the arrival of the second clock pulse, gate G12 will open to reset flip-flop FF–5. The signal so produced is applied to gate G15. Since the latter gate constantly receives a reset signal from flip-flop FF–1, the arrival of the comparing pulse, which follows the second clock pulse, will open the gate to produce an output signal. Accordingly, two successive binary digits stored in flip-flops FF–5 and FF–6 are compared by the comparing pulse applied to gates G15 and G16. An output signal from gate G15 occurs if the digits occur in the order 0,1, and from gate G16 if the digits occur in the order 1,0. The read start signal derived from source 36 is also applied to flip-flop FF–8 to set the latter. The set signal so produced is applied to gate G19. The advancing pulses produce an output signal from gate G19 which is applied to flip-flop FF–9 to set the latter and prevent a reset output signal therefrom. Gate G17 remains closed prior to the detection of a start code pattern and is opened conditionally only upon the arrival of a reset signal from flip-flop FF–1. The occurrence of two successive One digits at the end of the block start code, as shown at times 4 and 5 in Fig. 5A, will produce simultaneous set signals from flip-flops FF–5 and FF–6, both of which are applied to gate G17. The subsequent arrival of a comparing pulse will open gate G17, the output signal resetting flip-flop FF–8. The reset signal derived from flip-flop FF–8 conditionally opens gate G18 so that the subsequently arriving advancing pulse will produce an output signal which will reset flip-flop FF–9. The reset signal from flip-flop FF–9 is applied to gate G3 together with the set signal derived from flip-flop FF–6. The reset signals produced by flip-flops FF–8 and FF–9 are illustrated in Figs. 5R and 5S, while the output signals of gate G3 are shown in Fig. 5T. Accordingly, gate G3 will open to read information out of the system. As explained above, prior to the occurrence of an output signal derived from gate G17, gate G19 will produce output signals in synchronism with the advancing pulses applied thereto to retain flip-flop FF–9 in a set condition. It is only upon the occurrence of the two successive One digits at the end of a block start code that gate G17 opens. The timing is such that gate G3 produces an output signal with the termination of the 1,0 digits of the start code pattern, followed by the information of the data block that is to be read.

It is to be noted that during the period when the start code detector is seeking a start code, delayed crossover pulses pass through gate G1 to delay line B and timing pulses are formed. Flip-flops FF–5 and FF–6 are therefore active during this period as well as at the time when the start code pattern is terminated. The transition is therefore a smooth one from the mode of start code detection operation to that of the reading operation.

Having thus described the invention, it will be apparent that numerous modifications and departures as explained above, may now be made by those skilled in the art, all of which fall within the scope contemplated by the invention. Consequently, the invention herein disclosed is to be construed as limited only by the spirit and scope of the appended claims.

What is claimed is:

1. Apparatus for interpreting an electrical waveform representing a sequence of binary digits, said waveform having polarity crossovers indicative of digital changes, comprising means responsive to said waveform for producing crossover pulses, means responsive to the application of said crossover pulses for deriving a clock pulse for each impressed crossover pulse, means for regeneratively reproducing the last occurring clock pulse, and means responsive to a later occurring crossover pulse for preventing the regenerative reproduction of said last occurring clock pulse.

2. A self-clocked digital data readout system comprising a source of signals representing a sequence of binary digits, said signals having polarity crossovers indicative of a change in binary digits, means coupled to said source for producing crossover pulses, delay means responsive to the application of a crossover pulse for providing a clock pulse a fixed interval after the impress of said crossover pulse, means including a gate for periodically recirculating said clock pulse through said delay means, means responsive to a succeeding crossover pulse for closing said gate to prevent recirculation, said succeeding crossover pulse being applied to said delay means to provide another clock pulse after said fixed interval, and means for causing said gate to be opened in response to each clock pulse.

3. Apparatus for interpreting an electrical waveform representing a sequence of binary digits, said waveform having polarity crossovers caused by a change of digital value, said apparatus comprising means responsive to said waveform for producing delayed crossover pulses, means responsive to said crossover pulses for providing a clock pulse a fixed interval after the application of a crossover pulse, means including a gate for periodically recirculating said clock pulse, means responsive to a succeeding crossover pulse for closing said gate to inhibit recirculation, means for comparing successive portions of said waveform on either side of a polarity crossover to produce a control signal upon the occurrence of a spurious crossover, and means responsive to said control signal for preventing the application to said clock pulse providing means of the delayed crossover pulse derived from said spurious crossover.

4. Apparatus for interpreting an electrical waveform representing a sequence of binary digits, said waveform having polarity crossovers indicative of digital changes, the digital data being arranged in blocks, each of said data blocks being preceded by a block start code, means for deriving crossover pulses upon the occurrence of polarity crossovers in said waveform, means for delaying said crossover pulses, means for shaping said delayed crossover pulses to derive clock pulses therefrom, means for delaying said clock pulses to derive recirculation pulses therefrom, means for applying said recirculation pulses to the input of said pulse shaping means in the absence of delayed crossover pulses to produce clock pulses at the output thereof, control means responsive to the appearance of a delayed crossover pulse to terminate said recirculation, and means responsive to said clock pulses for comparing successive portions of said waveform to provide a control signal when a delayed crossover pulse is derived from a spurious polarity crossover, said control means being responsive to said control signal to govern the application of said recirculation pulses to said pulse shaping means.

5. The apparatus of claim 4 wherein said block start code comprises a characteristic start code waveform pattern, and further including a start code detector comprising means for initiating data readout upon the continuous occurrence of a predetermined length of said start code pattern.

6. The apparatus of claim 5 wherein said start code detector comprises a counter for counting the number of crossover pulses derived from said start code pattern, said counter producing a readout initiation signal upon counting up to a predetermined number, and means responsive to a deviation of said waveform from said start code pattern before said predetermined number has been reached to re-set said counter to its starting position.

7. The apparatus of claim 5 wherein said start code detector comprises a time responsive circuit for measuring the time elapsed since the occurrence of the first crossover pulse derived from said start code pattern, said time responsive circuit producing a readout initiation signal after a predetermined time interval has elapsed, and means responsive to a deviation of said waveform from said start code pattern prior to the completion of said predetermined time interval to reset said time responsive circuit to its starting position.

8. The apparatus of claim 6 wherein said counter resetting means comprises a first circuit adapted to produce a reset signal unless a crossover pulse occurs during a predetermined first time interval, a second circuit adapted to produce a reset signal upon the occurrence of a crossover pulse during a predetermined second time interval, a third circuit responsive to a comparison of successive crossover pulses with the instantaneously occurring waveform polarity to produce a reset signal, and means for buffering said reset signals to said start code counter.

9. A self clocked data readout system for interpreting the binary digital data represented by an electrical waveform, said waveform being derived from a sequence of magnetized areas spaced at periodic intervals in a high density magnetic medium, said magnetized areas being representative of a sequence of binary digits stored in said medium, each pair of alternating binary digits represented by said waveform containing a true polarity crossover between said digits, sequences of successive like binary digits containing spurious polarity crossovers, said stored binary digit being organized into blocks of data, each block being preceded by a block start code, said readout system comprising means for deriving a clock pulse upon the occurrence of every true polarity crossover, means for producing clock pulses in the absence of true polarity crossovers by periodically recirculating the last occurring clock pulse, means for terminating said recirculation upon the occurrence of a true polarity crossover, means responsive to said clock pulses for comparing successive portions of said waveform which are contemporaneous with said clock pulses to provide a control signal upon the occurrence of the spurious polarity crossover, and control means responsive to said control signal to govern the recirculation of said clock pulses.

10. The apparatus of claim 9 and further comprising means for producing a crossover pulse in response to every waveform polarity crossover, means for feeding said crossover pulses to a delay line to obtain delayed crossover pulses at the output thereof, means for shaping said delayed crossover pulses and further delaying them to obtain clock pulses, means for delaying said clock pulses prior to recirculating them, the total time delay applied to each pulse between the output and the input of said pulse shaping means being equal to the pulse period of a succession of true crossover pulses derived from a sequence of alternating binary digits, said delayed crossover pulses being additionally applied to said control means to govern said recirculation.

11. The apparatus of claim 10 wherein said block start code comprises a characteristic waveform start code pattern, and further including a start code detector comprising means for initiating data readout upon the continuous occurrence of a predetermined length of said start code pattern.

12. The apparatus of claim 11 wherein said start code detector comprises a counter for counting the number of crossover pulses derived from said start code pattern, said counter producing a readout initiation signal upon counting up to a predetermined number, and means responsive to a deviation of said wavefrom from said start code pattern before said predetermined number has been reached to re-set said counter to its starting position.

13. The apparatus of claim 11 wherein said start code detector comprises a time responsive circuit for measuring the time elapsed since the occurrence of the first crossover pulse derived from said start code pattern, said time responsive circuit producing a readout initiation signal after a predetermined time interval has elapsed, and means responsive to a deviation of said waveform from said start code pattern prior to the completion of said predetermined time interval to reset said time responsive circuit to its starting position.

14. The apparatus of claim 12 wherein taps are provided on said delay line to provide crossover pulses having different time delays, a first time interval determined by a first pair of differently delayed crossover pulses, said first time interval bracketing each of said periodically occurring true crossover pulses derived from an alternating binary digit sequence, a first circuit adapted to be actuated by said first pair of differently delayed crossover pulses to produce a reset signal at its output during said first time interval, said first circuit being additionally responsive to the occurrence of a crossover pulse during said first time interval to prevent the appearance of said reset signal at its output, a second time interval covering the time span between periodic occurrences of said first time interval, a second circuit adapted to be actuated by said first pair of differently delayed crossover pulses to provide a reset signal upon the occurrence of a crossover pulse during said second time interval, a third time interval determined by a second pair of differently delayed crossover pulses, said third time interval covering portions of every pair of successive crossover pulse periods, a third circuit actuated by said second pair of differently delayed crossover pulses to provide a comparison of the waveform polarity occurring during said successive crossover pulse periods, said third circuit adapted to produce a reset signal when no change of polarity occurs between said successive crossover pulse periods, and means for buffering said reset signals to said start code counter.

15. A self clocked data readout system for interpreting the binary digital data represented by an electrical waveform, said waveform being derived from a sequence of magnetized areas spaced at periodic intervals in a high density magnetic medium, said magnetized areas being representative of a sequence of binary digits stored in said medium, each pair of alternating binary digits represented by said waveform containing a true polarity crossover between said digits, short sequences of successive like binary digits represented by said waveform being devoid of polarity crossovers, long sequences of successive like binary digits containing spurious polarity crossovers, said stored binary digits being organized into blocks of data, each block being preceded by a block start code, said block start code consisting of a characteristic waveform start code pattern comprising a sequence of alternating binary digits, said sequence having a predetermined number of digits and terminating with two like binary digits, a circuit for reading out each binary digit represented by said waveform in synchronism with a clock pulse comprising means for producing crossover pulses in response to each waveform polarity crossover, each sequence of alternating binary digits producing true periodic crossover pulses, long sequences of like binary digits producing spurious polarity crossover pulses, means for feeding said crossover pulses to a first delay line to obtain delayed crossover pulses at the output thereof, first gating means adapted to be actuated by said delayed crossover pulses, a pulse shaper for receiving the output signal of said first gating means, a second delay line connected to said pulse shaper, said shaped delayed crossover pulses being further delayed by one pulse period in said second delay line to appear as advancing pulses at the output thereof, second gating means controlled by said advancing pulses, the output of said second gating means being buffered to the input of said pulse shaper, said second delay line comprising intermediate taps to provide intermediately delayed clock pulses, means for sampling the instantaneously occurring waveform polarity with said clock pulses, means for deriving a signal responsive to said sampling operation, first and second storage means for storing successive signals so derived, said advancing pulses transferring said stored signals from said first to said second storage means, means responsive to said intermediately delayed clock pulses to provide a comparison of successive signals so stored, said comparison producing a control signal, means responsive to said control signal to control said first and second gating means, said storage means being arranged to produce simultaneous output signals upon the succession of two like binary digits, a start code counter responsive to the delayed crossover pulses received from said first delay line to provide a counter output signal upon counting up to said predetermined number, said first delay line further comprising taps to provide intermediately delayed crossover pulses, means responsive to a deviation from said start code pattern before said predetermined number has been reached to reset said counter, said resetting means comprising a first circuit actuated by a first pair of differently delayed crossover pulses derived from said first delay line taps to determine a first time interval, said first circuit adapted to produce a reset signal at its output if no true crossover pulse occurs during said first time interval, a second circuit actuated by said first pair of differently delayed crossover pulses, a second time interval covering the time span between periodic occurrences of said first time interval, said second circuit adapted to provide a reset signal if a spurious crossover pulse occurs during said second time interval, a third time interval determined by a second pair of differently delayed crossover pulses derived from said first delay line taps, a third circuit actuated by said second pair of differently delayed crossover pulses to provide a comparison of the waveform polarity existing during successive pulse periods, said third circuit being further adapted to provide a reset signal when there is no change of polarity between successive pulse periods, means for buffering said reset signals to said start code counter, a fourth circuit responsive to the simultaneous occurrence of signals traceable to said first and second storage means and to said start code counter to initiate the readout operation of a block of data, said fourth circuit providing self clocked data readout signals during the occurrence of said block.

References Cited in the file of this patent

UNITED STATES PATENTS 2,700,155 Clayden ............... Jan. 18, 1955